(12) United States Patent
Birch (10) Patent No.: US 11,630,888 B2
(45) Date of Patent: Apr. 18, 2023

(54) SYSTEM FOR TIME-BASED CREDENTIAL ACCESS

(71) Applicant: BANK OF AMERICA CORPORATION, Charlotte, NC (US)

(72) Inventor: Christopher Daniel Birch, Tega Cay, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 116 days.

(21) Appl. No.: 17/196,610

(22) Filed: Mar. 9, 2021

(65) Prior Publication Data
US 2022/0292168 A1  Sep. 15, 2022

(51) Int. Cl.
G06F 21/31 (2013.01)
G06F 21/45 (2013.01)
G06F 21/62 (2013.01)

(52) U.S. Cl.
CPC ............ *G06F 21/316* (2013.01); *G06F 21/45* (2013.01); *G06F 21/6218* (2013.01); *G06F 2221/2137* (2013.01)

(58) Field of Classification Search
CPC .... G06F 21/316; G06F 21/45; G06F 21/6218; G06F 2221/2137
See application file for complete search history.

(56) References Cited

U.S. PATENT DOCUMENTS

2019/0289017 A1* 9/2019 Agarwal .................. H04L 9/12
2020/0153831 A1* 5/2020 Baer ....................... H04L 63/10

\* cited by examiner

*Primary Examiner* — Han Yang
(74) *Attorney, Agent, or Firm* — Moore & Van Allen PLLC; James C. Edwards (57) ABSTRACT

Timed-based credential access to computer networks, applications and/or data files. A multi-factor authentication process in which time is an intrinsic part of the authentication/log-in process. Time periods are defined that coincide with a user's expected periods of use, such as standard work hours, and the user's credentials are only valid during the defined time period. This means that the user can only gain access to the computer network and/or the secure application(s) or data file(s) during those defined time periods. As a result, nefarious actors, in wrongful possession of a user's credentials, that attempt to access the computer network, application and/or data file outside of the defined period of time will be prevented from doing so.

20 Claims, 3 Drawing Sheets

SYSTEM FOR TIME-BASED CREDENTIAL ACCESS

FIELD OF THE INVENTION

The present invention relates to computer security and, more specifically, time-based user credentials for accessing secured computer networks, applications and/or data files.

BACKGROUND

Typically, nefarious actors access computer networks outside of a user's ordinary hours of use. This is because most computer networks employ surveillance means that can easily detect multiple incidences or log-ins to a network, application, secure data file or the like. As a result, the wrongdoer, in possession of a user's credentials, is more prone to access the network or other secured applications or data files and impersonate the user when the user is not likely to be logged on.

Therefore, a need exists to develop systems, methods, computer program products and the like that provide a heightened level of security for accessing computer networks, and/or sensitive applications or data files. Specifically, the desired systems, methods, computer program products and the like should prevent malicious actors from accessing computer networks and/or secure applications or data files outside of a user's expected time for network and/or application/data file use.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for timed-based credential access. In this regard, the present invention provides for a multi-factor authentication process in which time is an intrinsic part of the authentication/log-in process.

Specifically, time periods are defined that coincide with a user's expected periods of use (i.e., normal work hours or the like) and the user's credentials (e.g., username/password, biometric data or the like) are only valid during the defined time period. As a result, the user can only gain access to the computer network and/or the secure application(s) or data file(s) during those defined time periods.

In specific embodiments of the invention, manual intervention by individuals having designated management authority is provided as a means to provide user's access to the computer network, secure application/data file outside of the defined period of time. Such manual intervention requires the user to contact the individual having management authority and the individual accessing an access management system to make the necessary inputs to override the user's defined period of time. By having the user contact the individual with management authority, the manual intervention process assures the user, and not a wrongdoer, is attempting to access the network and/or application/data file during time periods when the user's credentials are invalid (i.e., so-called off-hours). In related embodiments of the invention, if the user attempts to access the network and/or application/data file outside of the defined period of time, the user may send an electronic message (e.g., Short Message Service (SMS) or text message) to a designated management authority, who in turn can simply respond in the positive to the electronic message as a means of granting the user access to the network and/or application/data file for a specified time period (e.g., one hour or less). In addition, the response by the designated management authority will automatically update the access management system to record the instance of access outside of the designated period of time.

In other embodiments of the invention, management intervention may be avoided for a user to gain access to the computer network and/or application/data file outside of the defined period of time. In one such embodiment of the invention, further user credentials are required if the user desires to access the computer network and/or application/data file outside of the defined period of time. For example, the user may be required to request issuance of a time-sensitive passcode that is sent to pre-registered email address or telephone number and subsequently entered/presented by the user to gain access outside of the defined period of time. In another example, the user may be presented with or more predetermined challenge questions (e.g., out-of-wallet questions), which the user must correctly answer to gain access outside of the defined period of time. In such embodiments of the invention, a notification may be sent to a management authority, so that the management authority is made aware of the user's access outside of the designated period of time.

A system for time-based credential access defines first embodiments of the invention. The system includes a first computing platform having a first memory and at least one first processing device in communication with the first memory. The first memory stores a user credential subsystem that is executable by the at least one first processing device. The user credential subsystem is configured to receive and store a plurality of user credentials. Each user credential is associated with a user from amongst a plurality of users and required to be input by an associated user to gain access to one or more networks, one or more applications and/or one or more data files.

The system additionally includes a second computing platform having a second memory and at least one second processing device in communication with the second memory. The second memory stores an access schedule subsystem that is executable by the at least one second processing device. The access schedule subsystem is configured to receive and store a plurality of access schedules. Each access schedule associated with a user from amongst the plurality of users and defines a time period during which user credentials associated a user are valid for accessing the one or more networks, the one or more applications and/or the one or more data files.

Additionally, the system includes a third computing platform having a third memory and at least one third processing device in communication with the third memory. The third memory stores an access application that is executable by the at least one third processing device. The access application is configured to (i) receive a first user input from a user desiring access to a network, an application or a data files from amongst the one or more networks, the one or more applications and the one or more data files, (ii) access the user credential subsystem to verify that the first user input matches user credentials for accessing the network, the application or the data file, (iii) access the access schedule subsystem to verify that a current time is within the time period defined by an access schedule during which user credentials associated the user are valid for accessing the network, the application, or the data file, and (iv) in response to verifying that (a) the user input matches the user credentials for accessing the network, the application or the data file, and (b) the current time is within the time period during which the user credentials are valid for accessing the network, the application or the data file, provide the user access to the network, the application or the data file.

In specific embodiments of the system, the access schedule subsystem is further configured to receive inputs from a scheduling authority that are configured to permanently or temporarily modify an access schedule for a user.

In other specific embodiments of the system, the access application is further configured to receive a second user input that requests initiating communication of an electronic message to at least one scheduling authority that indicates the user desires to access the network, the application or data file outside of the time period during which the user credentials are valid. In such embodiments of the system, the access application is further configured to receive, from the scheduling authority, a response that authorizes the user to access the network, application or data file outside of the time period during which the user credentials are valid, and provide the user access to the network, application or data file for a designated period of time. In related embodiments of the system, the access application is further configured to provide the user access to the network, application or data file for the designated period of time, which is preconfigured or defined by the scheduling authority in the response.

In additional specific embodiments of the system, access application is further configured to receive a second user input that requests initiating communication of (i) a code to a predetermined electronic mail address or telephone number associated with the user, and (ii) a notification to at least one scheduling authority that indicates that the user is attempting to access the network, the application or the data file outside of the time period during which the user credentials are valid. In response to receiving a third user input that consists of the code, provide the user access to the network, application or data file for a designated period of time In other specific embodiments of the system, at least one of the user credential subsystem or the access schedule subsystem is configured to receive and store, for the plurality of users, one or more user answers to one or more security challenge questions. In such embodiments of the system, the access application is further configured to (i) receive a second user input that requests presentation of at least one or of the one or more security challenge questions for accessing the network, the application or the data file outside of the time period during which the user credentials are valid, (ii) receive a third user input that provides an answer for each of the presented security challenge questions, (iii) access the user credential subsystem or the access schedule subsystem to verify that the third user input matches the stored user answers to one or more security challenge questions, and (iv) in response to verifying the match, provide the user access to the network, application or data file for a designated period of time.

In further specific embodiments of the system, the access schedule system is further configured to receive and store (i) a plurality of first access schedules, each first access schedule associated with a user from amongst the plurality of users and a network from amongst the one or more networks, (ii) a plurality of second access schedules, each second access schedule associated with a user from amongst the plurality of users and an application from amongst the one or more applications, and (iii) a plurality of third access schedules, each third access schedule associated with a user from amongst the plurality of users and a data file from amongst the one or more application. In related embodiments of the system, the time period defined by at least one of the second access schedule and the third access schedule for a specific user is a subset of the time period defined by the first access schedule for the specific user.

Moreover, in additional specific embodiments of the system, the access application is further configured to in response to failing to verify that (ii) the current time is within the time period during which the user credentials are valid for accessing the network, the application or the data file, deny the user access to the network, the application, or the data file, and (a) notify the user that the current time is outside of the time period during which the user credentials are valid for accessing the network, the application or the data file, and/or (b) initiate communication of a notification to at least one of (i) at least one schedule authority, and (ii) an information technology security entity that is configured to alert of an access request outside of the time period during which the user credentials are valid.

A computer-implemented method for time-based credential access defines second embodiments of the invention. The method is implemented by one or more computing processor devices. The method includes receiving and storing in computing memory a plurality of user credentials. Each user credential associated with a user from amongst a plurality of users and required to be input by an associated user to gain access to at least one chosen from the group comprising one or more networks, one or more applications and one or more data files. In addition, the method includes receiving and storing in computing memory a plurality of access schedules. Each access schedule is associated with a user from amongst the plurality of users and defines a time period during which user credentials associated a user are valid for accessing at least one chosen from the group comprising the one or more networks, the one or more applications and the one or more data files. Additionally, the method includes (i) receiving a first user input from a user desiring access to a network, an application or a data files from amongst the one or more networks, the one or more applications and the one or more data files, (ii) accessing the plurality of user credentials to verify that the first user input matches user credentials for accessing the network, the application or the data file, and (iii) accessing the plurality of access schedules to verify that a current time is within the time period defined by an access schedule during which user credentials associated the user are valid for accessing the network, the application, or the data file. Moreover, the method includes in response to verifying that (i) the user input matches the user credentials for accessing the network, the application or the data file, and (ii) the current time is within the time period during which the user credentials are valid for accessing the network, the application or the data file, providing the user access to the network, the application or the data file.

In specific embodiments the method further includes receiving inputs from a scheduling authority that are configured to permanently or temporarily modify an access schedule for a user.

In other specific embodiments the method further includes (i) receiving a second user input that requests initiating communication of an electronic message to a scheduling authority that indicates the user desires to access the network, the application or data file outside of the time period during which the user credentials are valid, (ii) receiving a response from the scheduling authority that authorizes the user to access the network, application or data file outside of the time period during which the user credentials are valid, and (iii) providing the user access to the network, application or data file for a designated period of time.

In still further specific embodiments the method includes receiving a second user input that requests initiating communication of (i) a code to a predetermined electronic mail address or telephone number associated with the user, and (ii) a notification to at least one scheduling authority that indicates that the user is attempting to access the network, the application or the data file outside of the time period during which the user credentials are valid and, in response to receiving a third user input that consists of the code, providing the user access to the network, application or data file for a designated period of time.

Moreover, in additional specific embodiments the method includes, in response to failing to verify that the current time is within the time period during which the user credentials are valid for accessing the network, the application or the data file, denying the user access to the network, the application, or the data file, and notifying the user that the current time is outside of the time period during which the user credentials are valid for accessing the network, the application or the data file and/or initiating communication of a notification to at least one of (i) at least one schedule authority, and (ii) an information technology security entity that is configured to alert of an access request outside of the time period during which the user credentials are valid.

A computer program product including a non-transitory computer-readable medium defines third embodiments of the invention. The computer-readable medium includes a first set of codes for causing a computer to a plurality of user credentials. Each user credential associated with a user from amongst a plurality of users and required to be input by an associated user to gain access to at least one chosen from the group comprising one or more networks, one or more applications and one or more data files. Additionally, the computer-readable medium includes a second set of codes for causing a computer to receive and store in computing memory a plurality of access schedules. Each access schedule associated with a user from amongst the plurality of users, wherein the access schedule defines a time period during which user credentials associated a user are valid for accessing at least one chosen from the group comprising the one or more networks, the one or more applications and the one or more data files. Further, the computer-readable medium includes a third set of codes for causing a computer to receive a first user input from a user desiring access to a network, an application or a data files from amongst the one or more networks, the one or more applications and the one or more data files. In addition, the computer-readable medium includes a fourth set of codes for causing a computer to access the plurality of user credentials to verify that the first user input matches user credentials for accessing the network, the application or the data file, and a fifth set of codes for causing a computer to access the plurality of access schedules to verify that a current time is within the time period defined by an access schedule during which user credentials associated the user are valid for accessing the network, the application, or the data file. Moreover, the computer-readable medium includes a sixth set of codes for causing a computer, in response to verifying that (i) the user input matches the user credentials for accessing the network, the application or the data file, and (ii) the current time is within the time period during which the user credentials are valid for accessing the network, the application or the data file, provide the user access to the network, the application or the data file.

In specific embodiments of the computer program product, the computer-readable medium further includes a seventh set of codes for causing a computer to receive inputs from a scheduling authority that are configured to permanently or temporarily modify an access schedule for a user.

In other specific embodiments of the computer program product, the computer-readable medium further includes a seventh set of codes for causing a computer to receive a second user input that requests initiating communication of an electronic message to a scheduling authority that indicates the user desires to access the network, the application or data file outside of the time period during which the user credentials are valid. In addition, the computer-readable medium includes an eighth set of codes for causing a computer to receive a response from the scheduling authority that authorizes the user to access the network, application or data file outside of the time period during which the user credentials are valid, and a ninth set of codes for causing a computer to provide the user access to the network, application or data file for a designated period of time.

In additional specific embodiments of the computer program product, the computer-readable medium further includes a seventh set of codes for causing a computer to, in response to failing to verify that the current time is within the time period during which the user credentials are valid for accessing the network, the application or the data file, deny the user access to the network, the application, or the data file, and an eighth set of codes for causing a computer to (i) notify the user that the current time is outside of the time period during which the user credentials are valid for accessing the network, the application or the data file, and (ii) initiate communication of a notification to at least one of (a) at least one schedule authority, and (b) an information technology security entity that is configured to alert of an access request outside of the time period during which the user credentials are valid.

Thus, systems, apparatus, methods, and computer program products herein described in detail below provide for timed-based credential access to a computer network, application and/or data file. Specifically, the present invention provides for a multi-factor authentication process in which time is an intrinsic part of the authentication/log-in process. Time periods are defined that coincide with a user's expected periods of use and the user's credentials are only valid during the defined time period. This means that the user can only gain access to the computer network and/or the secure application(s) or data file(s) during those defined time periods. As a result, nefarious actors, in wrongful possession of a user's credentials, that attempt to access the computer network, application and/or data file outside of the defined period of time will be prevented from doing so.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as Q SHARP (Q#), PYTHON, JAVA, PERL, SMALLTALK, C++, SPARK SQL, HADOOP HIVE or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" or "configured for" perform (or "configured for" performing) a certain function in a variety of ways, including, for example, by having one or more general-purpose circuits perform the function by executing particular computer-executable program code embodied in computer-readable medium, and/or by having one or more application-specific circuits perform the function.

Thus, as described in more detail below, embodiments of the present invention provide for timed-based credential access to computer networks, applications, data files and/or the like. In this regard, the present invention provides for multi-factor authentication systems, processes and the like in which time is an intrinsic part of authentication/log-in.

Specifically, time periods are defined that coincide with a user's expected periods of use (e.g., normal work hours or the like) and the user's credentials (e.g., username/password, biometric data or the like) are only valid for accessing the network, application or data file during the defined time period. As a result, the user can only gain access to the computer network and/or the secure application(s) or data file(s) during those defined time periods. In this regard, embodiments of the present invention, prevent nefarious entities, in wrongful possession of a user's credentials, from accessing the computer network, application and/or data file during those period of time which such access is most prevalent (i.e., outside of the user's expected period of use).

In specific embodiments of the invention, only manual intervention to an access management system by individuals having designated management authority is provided as a means to provide user's access to the computer network, secure application/data file outside of the defined period of time. Such manual intervention requires the user to contact the individual having management authority, thus assuring the user, and not a wrongdoer, is attempting to access the network and/or application/data file during time periods when the user's credentials are invalid (i.e., so-called off-hours). In related embodiments of the invention, if the user attempts to access the network and/or application/data file outside of the defined period of time, the user may send an electronic message (e.g., Short Message Service (SMS) or text message) to a designated management authority, who in turn can simply respond in the positive to the electronic message as a means of granting the user access to the network and/or application/data file for a specified time period (e.g., one hour or less). In addition, the response by the designated management authority will automatically update the access management system to record the instance of access outside of the designated period of time.

In other embodiments of the invention, management intervention may be avoided for a user to gain access to the computer network and/or application/data file outside of the defined period of time. In one such embodiment of the invention, further user credentials are required if the user desires to access the computer network and/or application/ data file outside of the defined period of time. For example, the user may be required to request issuance of a time-sensitive passcode that is sent to pre-registered email address or telephone number and subsequently entered/ presented by the user to gain access outside of the defined period of time. In another example, the user may be presented with or more predetermined challenge questions (e.g., out-of-wallet questions), which the user must correctly answer to gain access outside of the defined period of time. In such embodiments of the invention, a notification may be sent to a management authority, so that the management authority is made aware of the user's access outside of the designated period of time.

Figure 1:
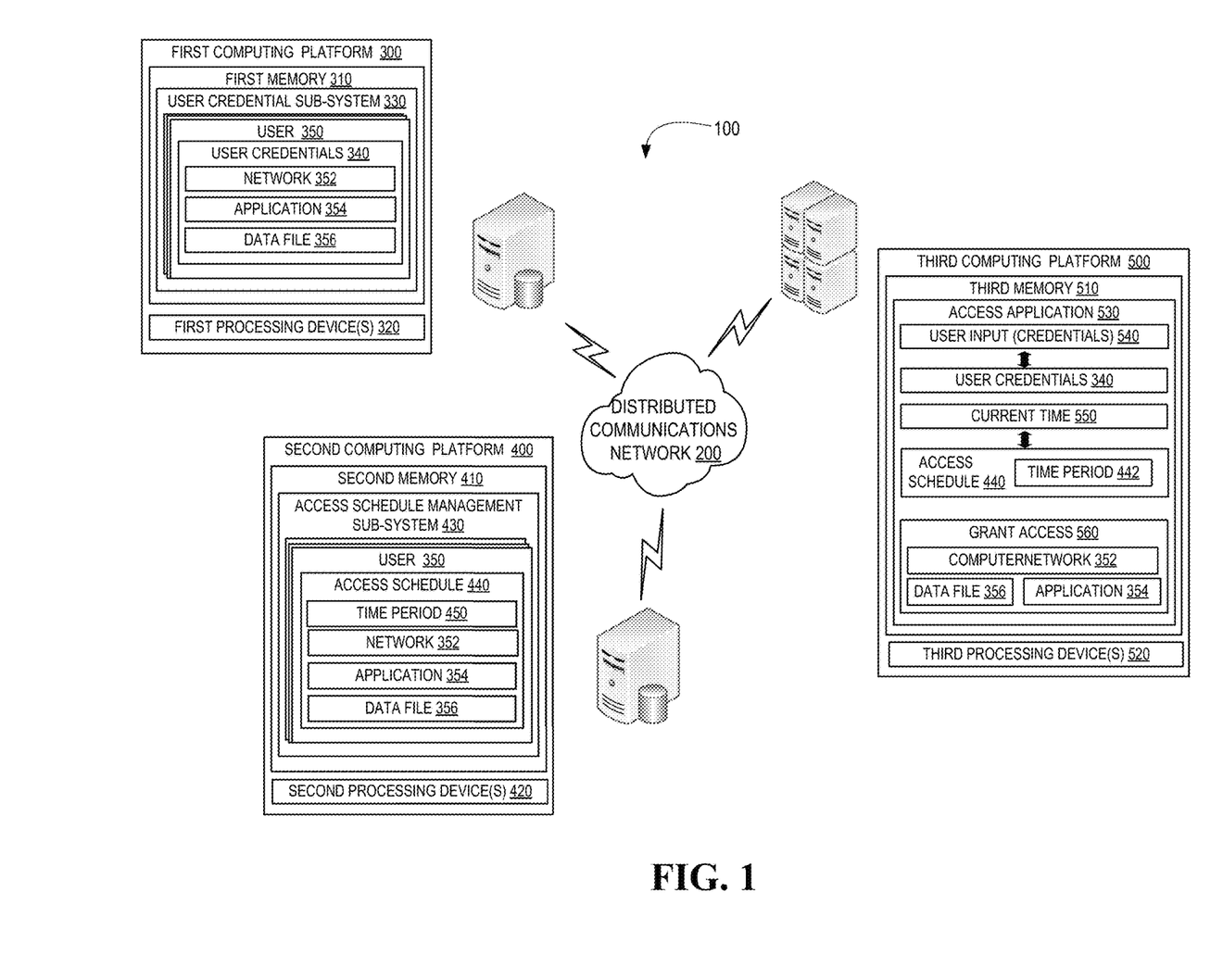
FIG. 1 is a schematic/block diagram of a system for time-based credential access to computer networks, applications, data files and the like, in accordance with embodiments of the present invention.

Turning now to the figures, FIG. 1 illustrates a system 100 for time-based credential access to computing networks, applications, dat files in accordance with embodiments of the present invention. The system is implemented in a distributed communications network 200 that may comprise wired or wireless networks, including, but not limited to, the Internet, one or more intranets, cellular networks or the like.

The system 100 includes a first computing platform 300 having a first memory 310 and one or more first processing devices 320 in communication with the first memory 310. The first memory 310 stores user credential sub-system 330 that is configured to receive and store user credentials 340. Each user credential 340 is associated with a user from amongst a plurality of users 350 and is required to be input by the user to gain access to a computer network 352, application 354 and/or data file 356. In this regard, the user credential 340 may comprise a passcode, a username and passcode, and/or biometric data or the like. The user credentials 340 may provide access to a specific computer network 352, application 354 or data file 356 or, in other embodiments the user credentials 340 may provide access to more than computer network 352, application 354, data file 356 or combinations thereof. Computer networks 352 as used herein includes sub-networks, directories and the like.

The system 100 additionally includes a second computing platform 400 having a second memory 410 and one or more second processing devices 420 in communication with the second memory 410. The second memory 410 stores access schedule management sub-system 430 that is configured to receive and store one or more access schedules 440 for each of the users 350. Each access schedule 440 defines a time period 450 during which user credentials 340 associated with a user 350 are valid for accessing to a computer network 352, application 354 and/or data file 356. In specific embodiments of the invention, an access schedule 440 may be specific to a time period 450 during which a single user credential 340 (i.e., one passcode, one username/passcode) are valid for accessing one or more computer networks 352, applications 354 data files 356 or combinations therefore. In such embodiments of the invention, each user 350 may have multiple access schedules 440 to accommodate for multiple different user credentials 340 In other embodiments of the invention, the access schedule 440 may define a plurality of time periods 450 with each time period being specific to a one of a plurality of different user credentials 340. In specific embodiments of the invention, a scheduling authority (e.g., supervisor, manager or the like) is granted rights to the access schedule management sub-system 430, such that, the scheduling authority can provide inputs to the access schedule management sub-system 430 that are configured to permanently or temporarily modify an access schedule 440 for a user (i.e., modify the time period 450 during which user credentials 340 are valid for accessing a computer network 352, application 354 or data file 356.

In specific embodiments of the system, the user credential sub-system 330 and the access schedule management sub-system 430 are combined into one sub-system, obviating the need for separate first and second computing platforms 300, 400. In such embodiments of the system, the combined sub-system stores both the user credentials 340 and associated access schedules 440.

The system 100 additionally includes a third computing platform 500 having a third memory 510 and one or more third processing devices 520 in communication with the second memory 510. The third memory 530 stores access application 530 that is executable by at least one of the one or more third processing devices 520. Access application 530 is configured to grant user's access to an associated computer network 352, application 356 or data file 356. As such, access application 530 530 may be a stand-alone application or may be incorporated into another application, module, platform, tool or the like.

In accordance with embodiments of the system 100, access application 530 is configured to receive a user input 540 from a user 350 desiring access to a computer network 352, application 354 or data file 356. The user input 540 are credentials that a user or other entity has previously defined/ set-up for accessing the computer network 352, application 354 or data file 356.

In response to receiving the user input 540, access application 530 is configured to access the user credential sub-system 330 to verify that the user input 540 matches the user credentials 340 assigned to the computer network 352, application 354 or data file 356 that the user 350 is desiring access to. In response to verifying that the user input 540 matches the user credentials 340 stored in the user credential sub-system 330, access application 530 is configured to access the access schedule management sub-system 430 to verify that a current time 550 is within the time period 442 defined by the access schedule 440 during which the user credentials 340 associated with the user 350 are valid for granting the user 350 access to the corresponding computer network 352, application 354 or data file 356.

In response to verifying that (i) the user input 540 matches the user credentials 340, and (ii) the current time 550 is within the time period 450 during which the user credentials 340 are valid for accessing the computer network 352, application 354 or data file 356, the user 350 is granted/ provided access 560 to the computer network 352, application 354 or data file 356. Conversely, in response to failing to verify either that (i) the user input 540 matches the the user credentials 340, or (ii) the current time 550 is within the time period 450 during which the user credentials 340 are valid for accessing the computer network 352, application 354 or data file 356, the user 350 is denied access to the computer network 352, application 354 or data file 356. In the event that the user 350 is denied access to the computer network 352, application 354 or data file 356 for failure to verify that the current time 550 is within the time period 450 during which the user credentials 340 are valid for accessing the computer network 352, application 354 or data file 356, the user may be provided with one or more means for (discussed infra, in relation to FIG. 2) overriding the access schedule 440 (i.e., accessing the computer network 352, application 354 or data file 356 outside of the defined time period 450).

Figure 2:
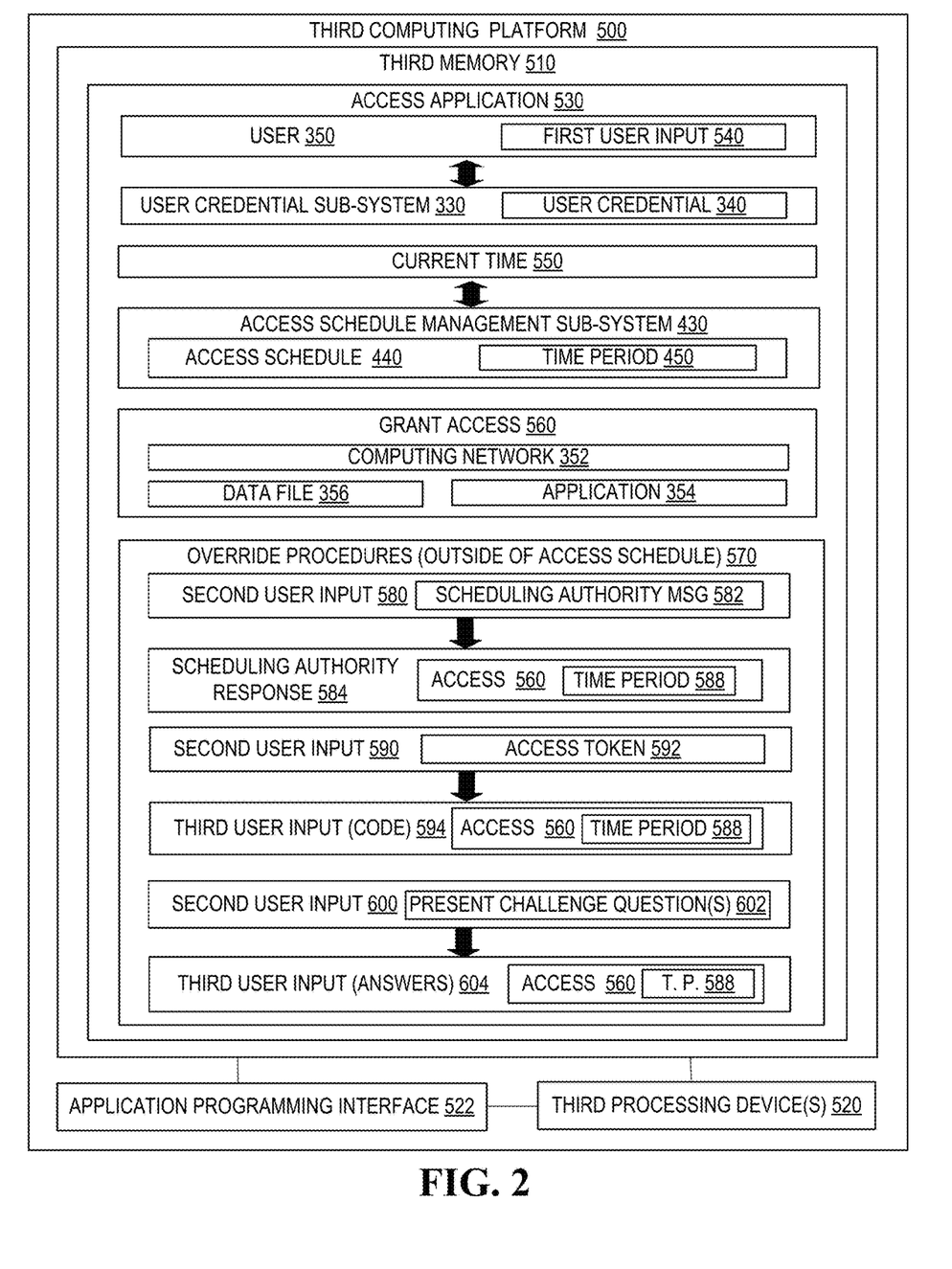
FIG. 2 is block diagram of one or more computing platforms configured for time-based credential access to computer networks, applications, data files and the like, in accordance with embodiments of the present invention.

Referring to FIG. 2, a block diagram is depicted of the third computing platform 500 including the access application 530, highlighting various alternate embodiments of the present invention. It should be noted that the details (e.g., third memory 510, third processing devices 520 and the like) of the third computing platform 500 discussed in relation to FIG. 2 equally apply to the details of the first and second computing platforms 300, 400.

Third computing platform 500 which may comprise one or more devices (e.g., application servers or the like) is configured to execute software programs, including engines, instructions, algorithms, modules, routines, applications, tools and the like. Third computing platform 500 includes third memory 510 and the like which may comprise volatile and non-volatile memory, such as read-only and/or random-access memory (RAM and ROM), EPROM, EEPROM, flash cards, or any memory common to computing platforms). Moreover, third memory 510 and the like may comprise cloud storage, such as provided by a cloud storage service and/or a cloud connection service.

Further, third computing platform 500 also includes one or more third processing device 520, which may be an application-specific integrated circuit ("ASIC"), or other chipset, logic circuit, or other data processing device configured to execute stored software/firmware including access application 530 or the like. Third processing device(s) 520 or the like may execute one or more application programming interface (APIs) 522 that interface with any resident programs, such as access application 530 or the like stored in the third memory 510 of the third computing platform 500 and any external programs. Third processing device(s) 520 may include various processing subsystems (not shown in FIG. 2) embodied in hardware, firmware, software, and combinations thereof, that enable the functionality of third computing platform 500 and the operability of third computing platform 500 on distributed communications network 200 (shown in FIG. 1). For example, processing subsystems allow for initiating and maintaining communications and exchanging data with other networked devices, such as first and second computing platforms 300, 400 (shown in FIG. 1). For the disclosed aspects, processing subsystems of third computing platform 500 may include any processing subsystem used in conjunction with access application 530 and related engines, tools, routines, sub-routines, algorithms, sub-algorithms, sub-modules thereof.

Third computing platform 500 additionally includes a communications module (not shown in FIG. 2) embodied in hardware, firmware, software, and combinations thereof, that enables electronic communications between third computing platform 500 and other network devices, such as, but not limited to, first and second computing platforms 300, 400. Thus, communication module may include the requisite hardware, firmware, software and/or combinations thereof for establishing and maintaining a network communication connection with one or more network devices.

Third memory 510 stores access application 530, which, as described in relation to FIG. 1, is configured to provide a user access to a computer network 352, application 354, data file 356 or the like. As previously discussed in relation to FIG. 2, access application 530 is configured to receive first user input 540 from a user desiring access to a computer network 352, application 354, or data file 356, and, in response, access the user credential sub-system 330 to verify that the first user input 540 matches user credentials 340 for the user 350 and the corresponding computer network 352, application 354 or data file 356.

Additionally, access application 530 is configured to access the access schedule management sub-system 430 to verify that the current time 550 is within the time period 450 defined by an access schedule 440 during which the user credentials 340 associated with the user 350 are valid for accessing the corresponding computing network 352, application 354 or data file 356.

In response to verifying that (i) the user input 540 matches the user credentials 340 for accessing the computer network 352, application 354 or data file 356, and (ii) the current time 550 is within the time period 450 during which the user credentials 340 are valid for accessing the computer network 352, application 354 or data file 356, the access application 530 is configured to grant/provide the user 350 access 560 to the computer network 352, application 354 or data file 356. Conversely, in response to failing to verify either that (i) the user input 540 matches the user credentials 340, or (ii) the current time 550 is within the time period 450 during which the user credentials 340 are valid for accessing the computer network 352, application 354 or data file 356, the access application denies the user 350 access to the computer network 352, application 354 or data file 356.

In the event that the user 350 is denied access to the computer network 352, application 354 or data file 356 for failure to verify that the current time 550 is within the time period 450 during which the user credentials 340 are valid for accessing the computer network 352, application 354 or data file 356, the user 350 may be provided with one or more means for overriding the access schedule 440 (i.e., accessing the computer network 352, application 354 or data file 356 outside of the defined time period 450). In specific embodiments of the invention, the user 350 is required to contact the scheduling authority, via secure communication channel (i.e., external from the access application 530), to request access to the computer network 352, application 354 or data file 356 outside of the defined time period 450. Once the security authority is contacted, they are required to access the access schedule management sub-system 430 to override the user's access schedule 440 and permit and record the access outside of the conventional time period 450. By having the user 350 directly contact the scheduling authority via a secure communication channel, such as, email, voice call, SMS/text or the like, the scheduling authority is able to insure that the user 350, is in fact, the user and not a nefarious entity/wrongdoer.

In other embodiments of the invention, the access application 530 itself may provide means for overriding the access schedule 440. In specific embodiments of the invention, the access application 530 is configured to receive a second user input 580 that requests a scheduling authority message 582 (e.g., an SMS/text message or the like) to be communicated to one or more scheduling authorities. In response to the scheduling authority responding to the message 582 with a scheduling authority response 584 (e.g., an SMS/text message response or the like), the user 350 is granted access 560 to the network. In this regard, an affirmative scheduling authority response 584 granting access, is communicated to the access schedule management subsystem 330 which records the override and configures the corresponding access schedule to temporarily allow the user 350 to gain access for a time period 588. The time period 588 during which the user 350 may access may be predetermined (e.g., the next 10 minutes) or may be defined by the scheduling authority in the scheduling authority response 584.

In other embodiments of the invention, the access application 530 may be configured to provide for overriding the access schedule absent approval/intervention by a scheduling authority. In one specific embodiment of the invention, the access application 530 is configured to receive a second user input 590 that is configured to a communicate an access token 592 (e.g., alphanumeric code or the like) to a preregistered user identifier (e.g., email address, mobile telephone number or the like). In response to receiving the access token 592, the access application 530 is configured to receive a third user input 594 comprising the access token 594, validate the code and grant the access 560 to the user 350. Access 560 is granted by communicating with the access schedule management sub-system 330 which records the override and configures the corresponding access schedule to temporarily allow the user 350 to gain access for a time period 588. Similarly, in another specific embodiment of the invention, the access application 530 is configured to receive a second user input 600 that is configured to a present one or more predetermined challenge questions 602 (e.g., out-of-wallet questions or the like) to the user 350. In response to presenting the challenge questions 602, the access application is configured to receive third user inputs 604 consisting of answers to the challenge questions, verify that the answers match those previously supplied by the user and grant the access 560 to the user 350. Access 560 is granted by communicating with the access schedule management sub-system 330 which records the override and configures the corresponding access schedule to temporarily allow the user 350 to gain access for a time period 588.

Figure 3:
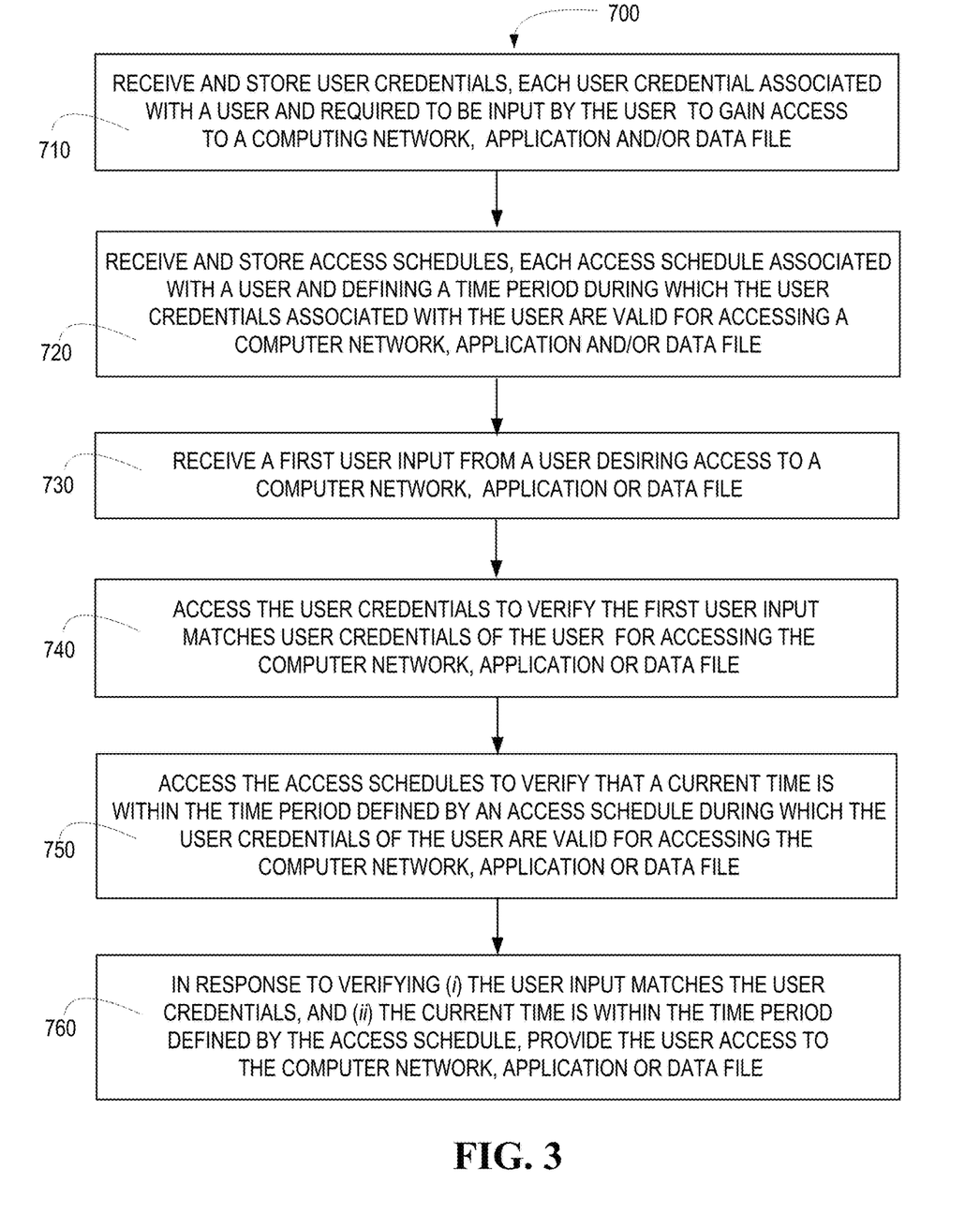
FIG. 3 is a flow diagram of method for time-based credential access to computer networks, applications, data files and the like, in accordance with embodiments of the present invention.

Referring to FIG. 3, a flow diagram is depicted of a method 700 for time-based credential access to computer-networks, applications, data files or the like, in accordance with embodiments of the present invention. At Event 710, user credentials are received and stored in computing memory. Each user credential is associated with one of a plurality of users and is configured to be input by the user to grant the user access to an associated computer network (and/or sub-computing networks, directories or the like), application and/or data file. As previously discussed, user credentials may comprise alphanumeric characters (e.g., username/passcode), biometric data or the like.

At Event 720, access schedules are received and stored in computing memory. Each access schedule defines a time period during which one or more user credentials associated with a user are valid for accessing at least one computer network, application and/or data file. The time period typically includes, but may not be limited to, the user's standard work hours.

At Event 730, a user input is received from a user desiring access to a corresponding computer network, application, or data file. The user input comprises the assumed user credentials which the user has preconfigured for accessing the computer network, application, or data file.

At Event 740, the user credentials stored in the computing memory are accessed to verify that the user input matches the user credentials of the user designating for accessing the computer network, application or data file (i.e., the user credentials inputted by the user match the user credentials in the computing memory/database). At Event 750, access schedules stored in the computing memory are accessed to verify that a current time is within the time period defined by the access schedule during which the user credentials associated with the user are valid for accessing the computer network, application or data file.

In response to verifying that (i) the user input matches the the user credentials, and (ii) the current time is within the time period during which the user credentials are valid, at Event 760, the user is provided access to the computer network, application or data file. Conversely, in response to failing to verify either that (i) the user input matches the the user credentials, or (ii) the current time is within the time period defined in the access schedule, the user is denied access to the computer network, application or data file. In the event the user is denied access due to the current time being outside of the time period defined in the access schedule or the user otherwise desires access outside of the time period defined in the access schedule, the method may provide for one or more means by which the access schedule may be overridden to provide the user access outside of the time period defined in the access schedule. Various examples of such override procedures have been previously discussed in relation to FIG. 2.

As evident from the preceding description, the systems, methods and the like described herein represents an improvement in computer network security and, specifically, network access security by providing for timed-based credential access to a computer network, application and/or data file, i.e., a multi-factor authentication process in which time is an intrinsic part of the authentication/log-in process. Periods of time are defined that coincide with a user's expected periods of use and the user's credentials are only valid during the defined period of time. This means that the user can only gain access to the computer network and/or the secure application(s) or data file(s) during those defined time periods. As a result, nefarious actors, in wrongful possession of a user's credentials, that attempt to access the computer network, application and/or data file outside of the defined period of time will be prevented from doing so.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for time-based credential access, the system comprising:
   a first computing platform including a first memory and at least one first processing device in communication with the first memory, wherein the first memory stores a user credential subsystem, executable by the at least one first processing device and configured to:
      receive and store a plurality of user credentials, each user credential associated with a user from amongst a plurality of users and required to be input by an associated user to gain access to at least one chosen from the group comprising one or more networks, one or more applications and one or more data files;
   a second computing platform including a second memory and at least one second processing device in communication with the second memory, wherein the second memory stores an access schedule management subsystem, executable by the at least one second processing device and configured to:
      receive and store a plurality of access schedules, each access schedule associated with a user from amongst the plurality of users, wherein the access schedule defines a time period during which user credentials associated a user are valid for accessing at least one chosen from the group comprising the one or more networks, the one or more applications and the one or more data files; and a third computing platform including a third memory and at least one third processing device in communication with the third memory, wherein the third memory stores an access application, executable by the at least one third processing device and configured to:

receive a first user input from a user desiring access to a network, an application or a data file from amongst the one or more networks, the one or more applications and the one or more data files, access the user credential subsystem to verify that the first user input matches user credentials for accessing the network, the application or the data file, access the access schedule management subsystem to verify that a current time is within the time period defined by an access schedule during which user credentials associated the user are valid for accessing the network, the application, or the data file, and in response to verifying that (i) the user input matches the user credentials for accessing the network, the application or the data file, and (ii) the current time is within the time period during which the user credentials are valid for accessing the network, the application or the data file, provide the user access to the network, the application or the data file.

2. The system of claim 1, wherein the access schedule management subsystem is further configured to:

receive inputs from a scheduling authority that are configured to permanently or temporarily modify an access schedule for a user.

3. The system of claim 1, wherein the access application is further configured to:

receive a second user input that requests initiating communication of an electronic message to at least one scheduling authority that indicates the user desires to access the network, the application or data file outside of the time period during which the user credentials are valid.

4. The system of claim 3, wherein the access application is further configured to:

receive, from the scheduling authority, a response that authorizes the user to access the network, application or data file outside of the time period during which the user credentials are valid, and provide the user access to the network, application or data file for a designated period of time.

5. The system of claim 4, wherein the access application is further configured to:

provide the user access to the network, application or data file for the designated period of time, wherein the designated period of time is defined by the scheduling authority in the response.

6. The system of claim 1, wherein the access application is further configured to:

receive a second user input that requests initiating communication of (i) a code to a predetermined electronic mail address or telephone number associated with the user, and (ii) a notification to at least one scheduling authority that indicates that the user is attempting to access the network, the application or the data file outside of the time period during which the user credentials are valid, and in response to receiving a third user input that consists of the code, provide the user access to the network, application or data file for a designated period of time.

7. The system of claim 1, wherein at least one of the user credential subsystem or the access schedule management subsystem is configured to receive and store, for the plurality of users, one or more user answers to one or more security challenge questions, wherein the access application is further configured to:

receive a second user input that requests presentation of at least one or of the one or more security challenge questions for accessing the network, the application or the data file outside of the time period during which the user credentials are valid, receive a third user input that provides an answer for each of the presented security challenge questions, access the user credential subsystem or the access schedule management subsystem to verify that the third user input matches the stored user answers to one or more security challenge questions, and in response to verifying the match, provide the user access to the network, application or data file for a designated period of time.

8. The system of claim 1, wherein the access schedule management subsystem is further configured to:

receive and store (i) a plurality of first access schedules, each first access schedule associated with a user from amongst the plurality of users and a network from amongst the one or more networks, (ii) a plurality of second access schedules, each second access schedule associated with a user from amongst the plurality of users and an application from amongst the one or more applications, and (iii) a plurality of third access schedules, each third access schedule associated with a user from amongst the plurality of users and a data file from amongst the one or more data files.

9. The system of claim 8, wherein the time period defined by at least one of the second access schedule and the third access schedule for a specific user is a subset of the time period defined by the first access schedule for the specific user.

10. The system of claim 1, wherein the access application is further configured to:

in response to failing to verify that (ii) the current time is within the time period during which the user credentials are valid for accessing the network, the application or the data file, deny the user access to the network, the application, or the data file, and notify the user that the current time is outside of the time period during which the user credentials are valid for accessing the network, the application or the data file.

11. The system of claim 1, wherein the access application is further configured to:

in response to failing to verify that (ii) the current time is within the time period during which the user credentials are valid for accessing the network, the application or the data file, deny the user access to the network, the application or the data file, and initiate communication of a notification to at least one of (i) at least one schedule authority, and (ii) an information technology security entity that is configured to alert of an access request outside of the time period during which the user credentials are valid.

12. A computer-implemented method for time-based credential access, the method implemented by one or more computing processor devices and comprising:

receiving and storing in first computing memory a plurality of user credentials, each user credential associated with a user from amongst a plurality of users and required to be input by an associated user to gain access to at least one chosen from the group comprising one or more networks, one or more applications and one or more data files;

receiving and storing in second computing memory a plurality of access schedules, each access schedule associated with a user from amongst the plurality of users, wherein the access schedule defines a time period during which user credentials associated a user are valid for accessing at least one chosen from the group comprising the one or more networks, the one or more applications and the one or more data files;

receiving a first user input from a user desiring access to a network, an application or a data file from amongst the one or more networks, the one or more applications and the one or more data files, accessing the plurality of user credentials to verify that the first user input matches user credentials for accessing the network, the application or the data file, accessing the plurality of access schedules to verify that a current time is within the time period defined by an access schedule during which user credentials associated the user are valid for accessing the network, the application, or the data file, and in response to verifying that (i) the user input matches the user credentials for accessing the network, the application or the data file, and (ii) the current time is within the time period during which the user credentials are valid for accessing the network, the application or the data file, providing the user access to the network, the application or the data file.

13. The computer-implemented method of claim 12, further comprising:

receiving a second user input that requests initiating communication of an electronic message to a scheduling authority that indicates the user desires to access the network, the application or data file outside of the time period during which the user credentials are valid;

receiving a response from the scheduling authority that authorizes the user to access the network, application or data file outside of the time period during which the user credentials are valid, and providing the user access to the network, application or data file for a designated period of time.

14. The computer-implemented method of claim 12, further comprising:

receiving a second user input that requests initiating communication of (i) a code to a predetermined electronic mail address or telephone number associated with the user, and (ii) a notification to at least one scheduling authority that indicates that the user is attempting to access the network, the application or the data file outside of the time period during which the user credentials are valid, and in response to receiving a third user input that consists of the code, providing the user access to the network, application or data file for a designated period of time.

15. The computer-implemented method of claim 12, further comprising:

in response to failing to verify that (ii) the current time is within the time period during which the user credentials are valid for accessing the network, the application or the data file, denying the user access to the network, the application, or the data file, and notifying the user that the current time is outside of the time period during which the user credentials are valid for accessing the network, the application or the data file.

16. The computer-implemented method of claim 12, further comprising:

in response to failing to verify that (ii) the current time is within the time period during which the user credentials are valid for accessing the network, the application or the data file, denying the user access to the network, the application or the data file, and initiating communication of a notification to at least one of (i) at least one schedule authority, and (ii) an information technology security entity that is configured to alert of an access request outside of the time period during which the user credentials are valid.

17. A computer program product including a non-transitory computer-readable medium that comprises sets of codes for causing one or more computers to:

receive and store in first computing memory a plurality of user credentials, each user credential associated with a user from amongst a plurality of users and required to be input by an associated user to gain access to at least one chosen from the group comprising one or more networks, one or more applications and one or more data files;

receive and store in second computing memory a plurality of access schedules, each access schedule associated with a user from amongst the plurality of users, wherein the access schedule defines a time period during which user credentials associated a user are valid for accessing at least one chosen from the group comprising the one or more networks, the one or more applications and the one or more data files;

receive a first user input from a user desiring access to a network, an application or a data file from amongst the one or more networks, the one or more applications and the one or more data files, access the plurality of user credentials to verify that the first user input matches user credentials for accessing the network, the application or the data file, access the plurality of access schedules to verify that a current time is within the time period defined by an access schedule during which user credentials associated the user are valid for accessing the network, the application, or the data file, and in response to verifying that (i) the user input matches the user credentials for accessing the network, the application or the data file, and (ii) the current time is within the time period during which the user credentials are valid for accessing the network, the application or the data file, provide the user access to the network, the application or the data file.

18. The computer program product of claim 17, wherein the computer-readable medium further comprises a set of codes for causing the one or more computers to:

receive inputs from a scheduling authority that are configured to permanently or temporarily modify an access schedule for a user.

19. The computer program product of claim 17, wherein the computer-readable medium further comprises sets of codes for causing the one or more computers to:

receive a second user input that requests initiating communication of an electronic message to a scheduling authority that indicates the user desires to access the network, the application or data file outside of the time period during which the user credentials are valid;

receive a response from the scheduling authority that authorizes the user to access the network, application or data file outside of the time period during which the user credentials are valid, and provide the user access to the network, application or data file for a designated period of time.

20. The computer program product of claim 17, wherein the computer-readable medium further comprises sets of codes for causing the one or more computers to:

in response to failing to verify that (ii) the current time is within the time period during which the user credentials are valid for accessing the network, the application or the data file, deny the user access to the network, the application, or the data file, and (i) notify the user that the current time is outside of the time period during which the user credentials are valid for accessing the network, the application or the data file, and (ii) initiate communication of a notification to at least one of (a) at least one schedule authority, and (b) an information technology security entity that is configured to alert of an access request outside of the time period during which the user credentials are valid.

\* \* \* \* \*